(12) United States Patent
Saha

(10) Patent No.: US 11,908,488 B2
(45) Date of Patent: Feb. 20, 2024

(54) ASSESSING READING ABILITY THROUGH GRAPHEME-PHONEME CORRESPONDENCE ANALYSIS

(71) Applicant: METAMETRICS, INC., Durham, NC (US)

(72) Inventor: Neena Marie Saha, Cary, NC (US)

(73) Assignee: METAMETRICS, INC., Durham, NC (US)

( * ) Notice: Subject to any disclaimer, the term of this patent is extended or adjusted under 35 U.S.C. 154(b) by 201 days.

(21) Appl. No.: 17/333,808

(22) Filed: May 28, 2021

(65) Prior Publication Data
US 2022/0383895 A1 Dec. 1, 2022

(51) Int. Cl.
*G10L 25/51* (2013.01)
*G10L 15/02* (2006.01)
(Continued)

(52) U.S. Cl.
CPC ............ *G10L 25/51* (2013.01); *G09B 17/003* (2013.01); *G10L 15/02* (2013.01); *G10L 15/26* (2013.01); *G10L 2015/025* (2013.01)

(58) Field of Classification Search
CPC ......... G10L 25/51; G10L 15/02; G10L 15/26; G10L 2015/025; G10L 13/08;
(Continued)

(56) References Cited

U.S. PATENT DOCUMENTS

| 6,726,486 B2 | 4/2004 | Budra |
| 6,755,657 B1 | 6/2004 | Wasowicz |

(Continued)

FOREIGN PATENT DOCUMENTS

| WO | WO-2021099834 A1 * | 5/2021 | ............. A61B 5/123 |
| WO | 2022250828 A1 | 12/2022 | |

OTHER PUBLICATIONS

Jeremy M. Law, Astrid De Vos, Jolijn Vanderauwera, Jan Wouters, Pol Ghesquière and Maaike Vandermosten, "Grapheme-Phoneme Learning in an Unknown Orthography: A Study in Typical Reading and Dyslexic Children", Aug. 15, 2018, Frontiers in Psychology, www.frontiersin.org, vol. 9, pp. 1-10. (Year: 2018).*

(Continued)

*Primary Examiner* — Richemond Dorvil
*Assistant Examiner* — Nadira Sultana
(74) *Attorney, Agent, or Firm* — Tillman Wright, PLLC; Neal Wolgin; James D. Wright

(57) ABSTRACT

A computing device translates a spoken word into a corresponding ordered set of spoken phonemes and analyzes correctness of the spoken word relative to a target word. The analyzing includes attempting to locate each of the spoken phonemes in an ordered set of grapheme-phoneme correspondences (GPCs) describing the target word, and determining whether or not the ordered set of spoken phonemes comprises a same number of phonemes as in the ordered set of GPCs. The analyzing also includes comparing the order of the ordered set of spoken phonemes against the order of the ordered set of GPCs. The computing device generates a report, based on the analyzing, that identifies at least one of the GPCs in the ordered set of GPCs as having been incorrectly applied in decoding the target word.

20 Claims, 11 Drawing Sheets

(51) Int. Cl.
*G09B 17/00* (2006.01)
*G10L 15/26* (2006.01)

(58) Field of Classification Search
CPC ...... G09B 17/003; G09B 19/04; G09B 19/08; G09B 5/00; G09B 5/04; G06F 40/232
See application file for complete search history.

(56) References Cited

U.S. PATENT DOCUMENTS

| | | | |
|---|---|---|---|
| 7,219,059 B2 | 5/2007 | Gupta et al. | |
| 8,271,281 B2 | 9/2012 | Jayadeva et al. | |
| 8,777,626 B2 | 7/2014 | Levy et al. | |
| 9,582,489 B2* | 2/2017 | McAteer | G06F 40/232 |
| 10,332,417 B1* | 6/2019 | Brown | G09B 5/12 |
| 2004/0072131 A1* | 4/2004 | Wasowicz | G09B 5/04 |
| | | | 434/178 |
| 2005/0153263 A1* | 7/2005 | De Ley | G09B 5/00 |
| | | | 434/169 |
| 2006/0195319 A1* | 8/2006 | Prous Blancafort | G10L 15/18 |
| | | | 704/235 |
| 2007/0055515 A1* | 3/2007 | Lassalle | G10L 13/08 |
| | | | 704/243 |
| 2011/0313762 A1* | 12/2011 | Ben-David | G10L 13/08 |
| | | | 704/270.1 |
| 2015/0243278 A1* | 8/2015 | Kibre | G10L 15/187 |
| | | | 704/243 |
| 2018/0341641 A1* | 11/2018 | Cutting | G06F 40/232 |
| 2020/0058230 A1* | 2/2020 | Hosp | G09B 7/04 |
| 2020/0184958 A1 | 6/2020 | Norouzi et al. | |
| 2021/0049927 A1 | 2/2021 | Saha et al. | |
| 2021/0398445 A1* | 12/2021 | Shimaj | G09B 11/00 |
| 2021/0398518 A1* | 12/2021 | Shimaj | G09B 19/08 |
| 2022/0115002 A1* | 4/2022 | Gong | G10L 15/25 |
| 2022/0199071 A1 | 6/2022 | Voss et al. | |

OTHER PUBLICATIONS

"International Search Report" and "Written Opinion of the International Search Authority" (ISA/US) in METAMETRICS, Inc., International Patent Application Serial No. PCT/US2022/026639, dated Aug. 26, 2022 (10 pages).

Berndt, R. et al., "Empirically derived probabilities for grapheme-to-phoneme correspondences in English", Behavior Research Methods, Instruments & Computers, 19(1), Jan. 1, 1987, 19(1), pp. 1-9, Retrieved from Internet: https://link.springer.com/article/10.3758/BF03207663, retrieved on May 24, 2021.

\* cited by examiner

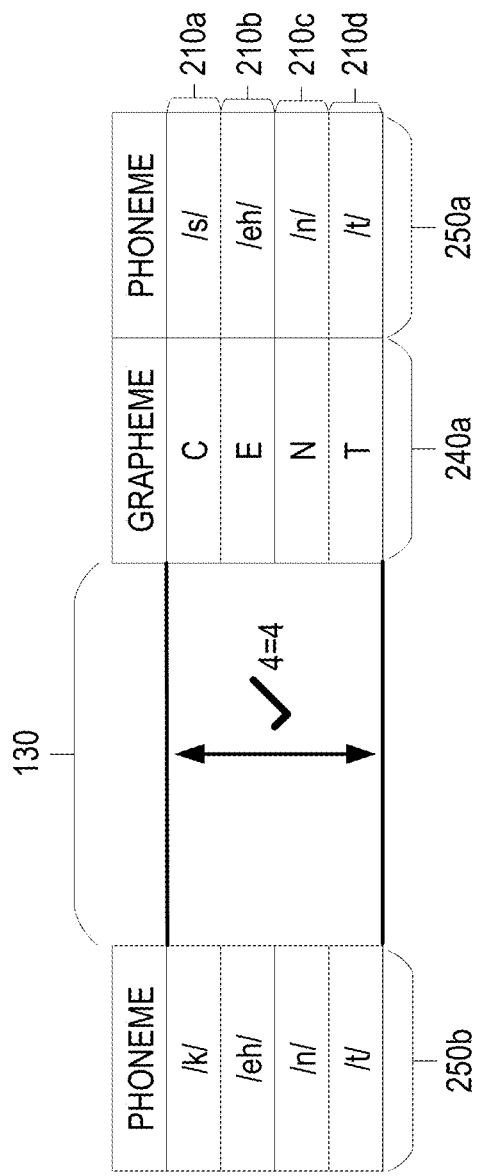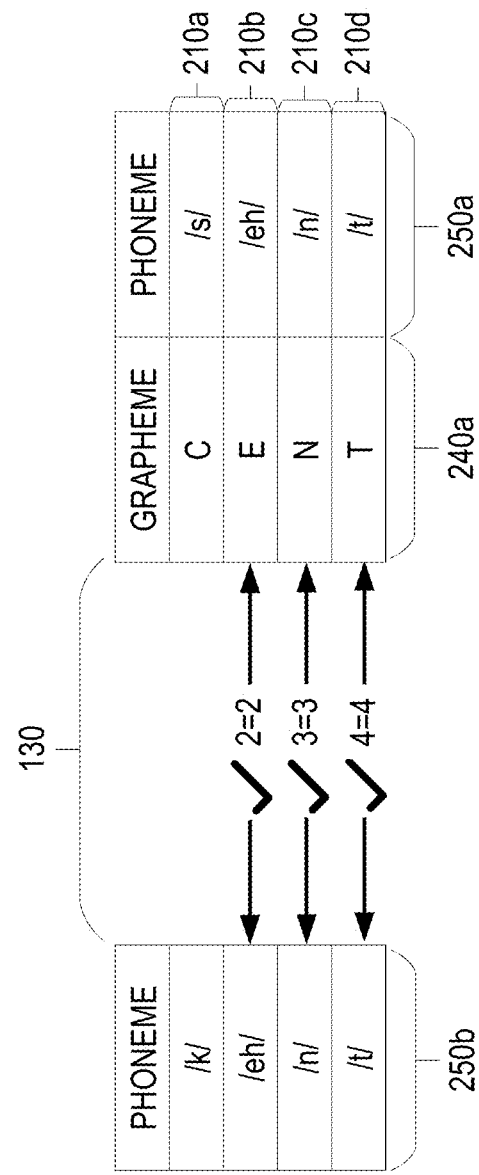

| TARGET WORD 150 | SPOKEN WORD 120 | 1ST GPC PHONEME | 2ND GPC PHONEME | 3RD GPC PHONEME | 4TH GPC PHONEME |
|---|---|---|---|---|---|
| TELL | TAP | T | EH | L | |
| NEW | NEWT | N | UW | | |
| TIP | | T | IH | P | |
| TAP | TIP | T | AE | P | |
| TOP | | T | AA | P | |
| TEN | | T | EH | N | |
| NET | | N | EH | T | |
| WENT | WET | W | EH | N | T |
| HOUSE | | HH | AW | S | |
| RUN | | R | AH | N | |
| YARN | YES | Y | AA | R | N |

ASSESSING READING ABILITY THROUGH GRAPHEME-PHONEME CORRESPONDENCE ANALYSIS

BACKGROUND

In the context of reading, decoding is the application of a reader's knowledge of letter-sound combinations (also known as grapheme-phoneme correspondences (GPCs)) to identify words. Decoding is generally considered to be a prerequisite for higher-order reading skills. Without adequate decoding skills, students generally have significant difficulty in learning to read fluently or comprehending what they have read. Indeed, an alarming percentage of middle school children in the U.S. struggle to read. Learning to decode words is especially hard in English due to the complexity of its letter-sound system.

For example, the phoneme (i.e., sound) /f/ as in the words "fluff," "sphere," "tough," and "calf" can be represented in text by the graphemes (i.e., letters or combinations of letters) "f," "ff," "ph," "gh," and "lf." The phoneme /ch/ as in the words "cheap," "future," and "etch" can be represented by the graphemes "ch," "t," and "tch." The phoneme /ă/ as in the words "make," "rain," "play," "great," baby," "eight," "vein," and "they" can be represented by the graphemes "a_e," "ai," "ay," "ea," "-y," "eigh," "ei," and "ey." These are but a few examples of GPCs that readers of the English language are faced with navigating in order to build decoding skill.

Poor outcomes in many schools may, at least in part, be related to a disconnect between the level of instruction and the level of assessment. It stands to reason that if teachers are armed with better decoding assessment tools and techniques, those teachers will be better able to target instruction to the areas in which a particular student's decoding is weak. Unfortunately, known tools and techniques for decoding assessment have historically been limited in many ways.

SUMMARY

Embodiments of the present disclosure are generally directed to assessing decoding ability as implemented in a computing system. Particular embodiments analyze the decoding of spoken words at a granularity that far exceeds known techniques and produce more finely honed diagnostic information useful in directing educators toward more successful outcomes.

Particular embodiments include a method implemented by a computing system. The method comprises translating a spoken word into a corresponding ordered set of spoken phonemes, and analyzing correctness of the spoken word relative to a target word. The analyzing comprises attempting to locate each of the spoken phonemes in an ordered set of grapheme-phoneme correspondences (GPCs) describing the target word. The analyzing further comprises determining whether or not the ordered set of spoken phonemes comprises a same number of phonemes as in the ordered set of GPCs. The analyzing further comprises comparing the order of the ordered set of spoken phonemes against the order of the ordered set of GPCs. The method further comprises generating a report, based on the analyzing, that identifies at least one of the GPCs in the ordered set of GPCs as having been incorrectly applied in decoding the target word.

In some embodiments, the method further comprises failing to locate, in the ordered set of GPCs, an incorrectly spoken phoneme in the ordered set of spoken phonemes. Generating the report comprises, in response to failing to locate the incorrectly spoken phoneme, identifying the incorrectly spoken phoneme in the report.

In some embodiments, the analyzing further comprises identifying, as one of the incorrectly applied GPCs, a GPC in the ordered set of GPCs that comprises a phoneme not included in the ordered set of spoken phonemes.

In some embodiments, generating the report comprises including, in the report, a phoneme selection correctness score computed based on an extent to which the spoken phonemes are located in the ordered set of GPCs.

In some embodiments, generating the report comprises including, in the report, a grapheme selection correctness score computed based on an extent to which the spoken phonemes are phonetically valid pronunciations of the graphemes in the ordered set of GPCs.

In some embodiments, generating the report comprises including, in the report, a positional correctness score computed based on an extent to which the spoken phonemes are ordered in accordance with the ordered set of GPCs.

In some embodiments, generating the report comprises including, in the report, an auditory similarity score computed based on how phonetically close the spoken phonemes are to the phonemes in the ordered set of GPCs.

In some embodiments, translating the spoken word into the corresponding ordered set of spoken phonemes comprises processing received audio comprising the spoken word using a speech-to-text engine to obtain text corresponding to the word, and converting the text into the ordered set of spoken phonemes.

In some embodiments, translating the spoken word into the corresponding ordered set of spoken phonemes comprises identifying each of the spoken phonemes in received audio comprising the spoken word without processing the spoken word into corresponding text first.

Other embodiments include a computing device comprising processing circuitry and interface circuitry communicatively connected to the processing circuitry. The interface circuitry is configured to load instructions of a computer program into the processing circuitry such that the processing circuitry is configured to translate a spoken word into a corresponding ordered set of spoken phonemes, and analyze correctness of the spoken word relative to a target word. To analyze the correctness, the processing circuitry is configured to attempt to locate each of the spoken phonemes in an ordered set of grapheme-phoneme correspondences (GPCs) describing the target word, and determine whether or not the ordered set of spoken phonemes comprises a same number of phonemes as in the ordered set of GPCs. To analyze the correctness, the processing circuitry is further configured to compare the order of the ordered set of spoken phonemes against the order of the ordered set of GPCs. The processing circuitry is further configured to generate a report, based on the analyzing, that identifies at least one of the GPCs in the ordered set of GPCs as having been incorrectly applied in decoding the target word.

In some embodiments, the processing circuitry is further configured to fail to locate, in the ordered set of GPCs, an incorrectly spoken phoneme in the ordered set of spoken phonemes. To generate the report the processing circuitry is configured to, in response to failing to locate the incorrectly spoken phoneme, identify the incorrectly spoken phoneme in the report.

In some embodiments, to analyze the correctness the processing circuitry is further configured to identify, as one of the incorrectly decoded GPCs, a GPC in the ordered set of GPCs that comprises a phoneme not included in the ordered set of spoken phonemes.

In some embodiments, to generate the report the processing circuitry is configured to include, in the report, a phoneme selection correctness score computed based on an extent to which the spoken phonemes are located in the ordered set of GPCs.

In some embodiments, to generate the report the processing circuitry is configured to include, in the report, a grapheme selection correctness score computed based on an extent to which the spoken phonemes are phonetically valid pronunciations of the graphemes in the ordered set of GPCs.

In some embodiments, to generate the report the processing circuitry is configured to include, in the report, a positional correctness score computed based on an extent to which the spoken phonemes are ordered in accordance with the ordered set of GPCs.

In some embodiments, to generate the report the processing circuitry is configured to include, in the report, an auditory similarity score computed based on how phonetically close the spoken phonemes are to the phonemes in the ordered set of GPCs.

In some embodiments, to translate the spoken word into the corresponding ordered set of spoken phonemes the processing circuitry is configured to process received audio comprising the spoken word using a speech-to-text engine to obtain text corresponding to the word, and convert the text into the ordered set of spoken phonemes.

In some embodiments, to translate the spoken word into the corresponding ordered set of spoken phonemes the processing circuitry is configured to identify each of the spoken phonemes in received audio comprising the spoken word without processing the spoken word into corresponding text first.

Yet other embodiments include a non-transitory computer readable medium storing software instructions that, when run on processing circuitry of a computing device, control the computing device. In particular, the computing device is controlled to translate a spoken word into a corresponding ordered set of spoken phonemes. The computing device is further controlled to analyze correctness of the spoken word relative to a target word. To analyze the correctness the computing device is controlled to attempt to locate each of the spoken phonemes in an ordered set of grapheme-phoneme correspondences (GPCs) describing the target word. To analyze the correctness the computing device is controlled to determine whether or not the ordered set of spoken phonemes comprises a same number of phonemes as in the ordered set of GPCs. To analyze the correctness the computing device is controlled to compare the order of the ordered set of spoken phonemes against the order of the ordered set of GPCs. The computing device is further controlled to generate a report, based on the analyzing, that identifies at least one of the GPCs in the ordered set of GPCs as having been incorrectly applied in decoding the target word.

In some embodiments, the computing device is further controlled to perform any of the methods described above.

BRIEF DESCRIPTION OF THE DRAWINGS

FIGS. 2-6 are schematic block diagrams illustrating particular examples of GPC-based approaches to analyzing the correctness of a spoken word relative to the target word, according to one or more embodiments of the present disclosure.

FIG. 8 is a table illustrating an example of decomposing a word into component parts, according to one or more embodiments of the present disclosure.

DETAILED DESCRIPTION

Figure 1:
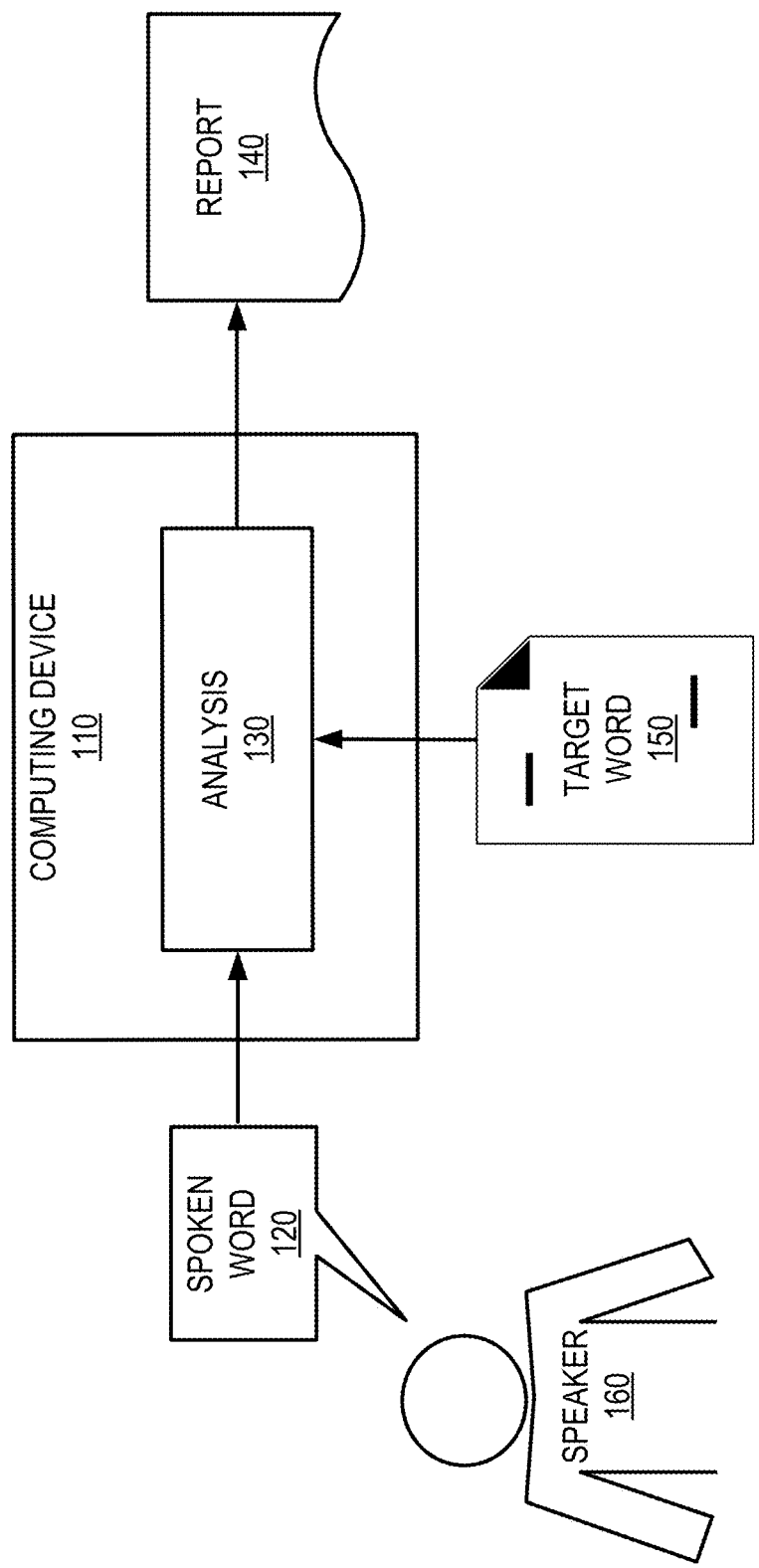
FIG. 1 is a schematic block diagram illustrating a general process flow consistent with particular embodiments of the present disclosure.

Embodiments of the present disclosure enhance literacy instruction by providing a user (e.g., a teacher) with data that enables them to target the specific grapheme-phoneme correspondences (GPCs) that a particular subject (e.g., a student, a child) has yet to master. A GPC is a specific phoneme (i.e., sound) paired with a specific grapheme (i.e., letter or combination of letters). For example, the word "it" is represented by an ordered set of two GPCs. The first GPC is a correspondence between the grapheme "i" and the phoneme "/ih/." The second GPC is a correspondence between the grapheme "t" and the phoneme "/t/." The graphemes in the set of GPCs, when evaluated in order, form the word "it" in written form. The phonemes in the set of GPCs, when spoken in order, form the word "it" as properly pronounced. The Common Core State Standards currently adopted in 41 states list 120 GPCs that children need to learn.

Existing techniques for assessing decoding are deficient in that they provide assessment data that lacks sufficient granularity to identify particular GPCs of concern. A GPC is a specific phoneme (sound) paired with a specific grapheme (letter or combination of letters). For example, the word "it" has two GPCs. One of the GPCs is a correspondence between the grapheme "i" and the phoneme "/ih/." The other of the GPCs is a correspondence between the grapheme "t" and the phoneme "/t/." The Common Core State Standards currently adopted in 41 states list 120 GPCs that children need to learn.

Current decoding tests generally only report the number of words the child read correctly, leaving teachers with no objective tools to determine which GPCs the student missed. Therefore, teachers often are not provided with sufficient information regarding the GPCs that need to be taught or reinforced. Consequently, educators are often left with the subjective task of inferring from word-level errors more granular level conclusions about GPC correctness, which is time-consuming, unreliable, and assumes that teachers have adequate GPC knowledge (which is not always the case). Because teachers don't know which GPCs to hone-in on, teachers are not able to quickly and objectively determine why a child struggles to read words correctly is a critical gap, thereby wasting hours of instructional time.

Consider an example in which a student is unable to decode the word "straight." If a teacher is not able to see that a student is missing all words that have the "ai" grapheme, which produces the "long a" phoneme, they may misdiagnose errors and spend many hours teaching students that the three beginning consonants in 'straight' blend to make "s" "t" and "r," thereby wasting precious instructional time.

As such, there is a critical need for accurately assessing GPC knowledge to guide instruction and match students (and particularly children) with decodable books. Embodiments of the present disclosure address this deficiency through use of a computing system configured to help teachers analyze GPC errors. In some particular embodiments, the system further assists teachers by matching students with suitably decodable books. To determine decoding proficiency, one or more embodiments include an error analysis algorithm and/or a scoring algorithm.

The error analysis algorithm may analyze reading errors at the GPC level. For example, if a target word was "cent" and the child read it out loud as /kent/ (rather than the correct /sent/), the error analysis algorithm may shows that the child's attempt: (1) contained the same number of phonemes as the target, (2) contained 75% of the correct phonemes, (3) contained 75% of the phonemes in the correct order, (4) had the initial phoneme wrong; and/or (5) their error was a plausible phonemic alternative of the letter "c" in English (i.e., c does make /k/ in certain situations, but not in front of the letters "i", "e", or "y"). This latter error indicates the need to target the "c before i, e, or y" rule for instruction. Currently, teachers would not know this level of granularity and may instead re-teach "c" produces /s/ without explaining the rule. Or, worse, teachers may target GPCs like n to /n/ that the child got correct.

Preliminary tests of particular embodiments of the present disclosure indicate that automatically analyzing errors with an error analysis algorithm as proposed herein is possible and can yield important information regarding individual differences in decoding development. For example, children who were poor readers (according to standardized reading achievement tests) were more likely to make highly discrepant errors such as adding several additional phonemes in their errors.

The scoring algorithm may, for example, count GPCs and score texts based on GPC content. In one particular example, a scoring algorithm was tested that quantified the decodability of text by providing counts on up to 364 different GPCs.

Perhaps due to the complexity of the English letter-sound system, systems capable of providing the analytical granularity described above are presently non-existent for decoding tests. According to embodiments of the present disclosure, error analysis and scoring techniques are combined to overcome this challenge and provide a user-friendly system that empowers teachers to hone-in on the word reading errors of students, thereby helping teachers make maximal use of instructional time.

By quickly and accurately providing a user with the GPC strengths and weaknesses of a given subject, one or more embodiments can optimize reading instruction for many students, and especially for children with dyslexia who struggle specifically with GPC acquisition. Particular embodiments allow students to receive higher-quality decoding instruction by increasing accuracy, efficiency, and personalization, which, in turn, has several downstream effects like increased reading fluency and comprehension.

Particular embodiments may additionally or alternatively match students with suitably decodable books based on their pattern of word reading errors. For example, if a student's score report from their digital decoding test shows that they need reinforcement with the "c" to /s/ GPC, then they will be matched with books that contain a moderate number of the "c" to /s/ GPC so that the student can practice this GPC in context. According to embodiments, the "moderate number" of the GPC is a number of occurrences of the GPC above a first threshold and below a second threshold.

FIG. 1 is a schematic block diagram illustrating a general process flow consistent with particular embodiments of the present disclosure. As shown in FIG. 1, a computing device 110 obtains a spoken word 120 from a speaker 160 (e.g., a student, a user, a teacher) and a target word 150 (e.g., from a database, from the Internet, from memory circuitry within the computing device 110). The computing device 110 performs an analysis 130 to determine the correctness of the spoken word 120 relative to the target word 130, and generates a report 140 based on the analysis 130.

The spoken word 120 may be obtained by the computing device 110 in a variety of ways, depending on the embodiment. In one example, the computing device 110 may have a microphone that is able to record the speaker 160 as they vocalize the target word 150. In another example, the computing device 110 may have interface circuitry capable of interfacing with a remote device used by the speaker 160 over a network, and the computing device 110 may receive a media stream comprising the spoken word 120 from the speaker 160 via the network. In yet another example, the computing device 110 may receive a file comprising the spoken word 120, e.g., via a network download, email, installed memory device, or Multimedia Messaging Service (MMS) message attachment.

The target word 150 may be also be obtained by the computing device 110 in a variety of ways, depending on the embodiment. In one example, the computing device 110 may have access to a file and/or database comprising the target word 150. The file and/or database may, for example, be stored in a memory of the computing device 110 and/or may be stored on a separate device (e.g., a server, a storage device) and accessed by the computing device 110 via a network connection, cable, bus, and/or port.

Figure 2:
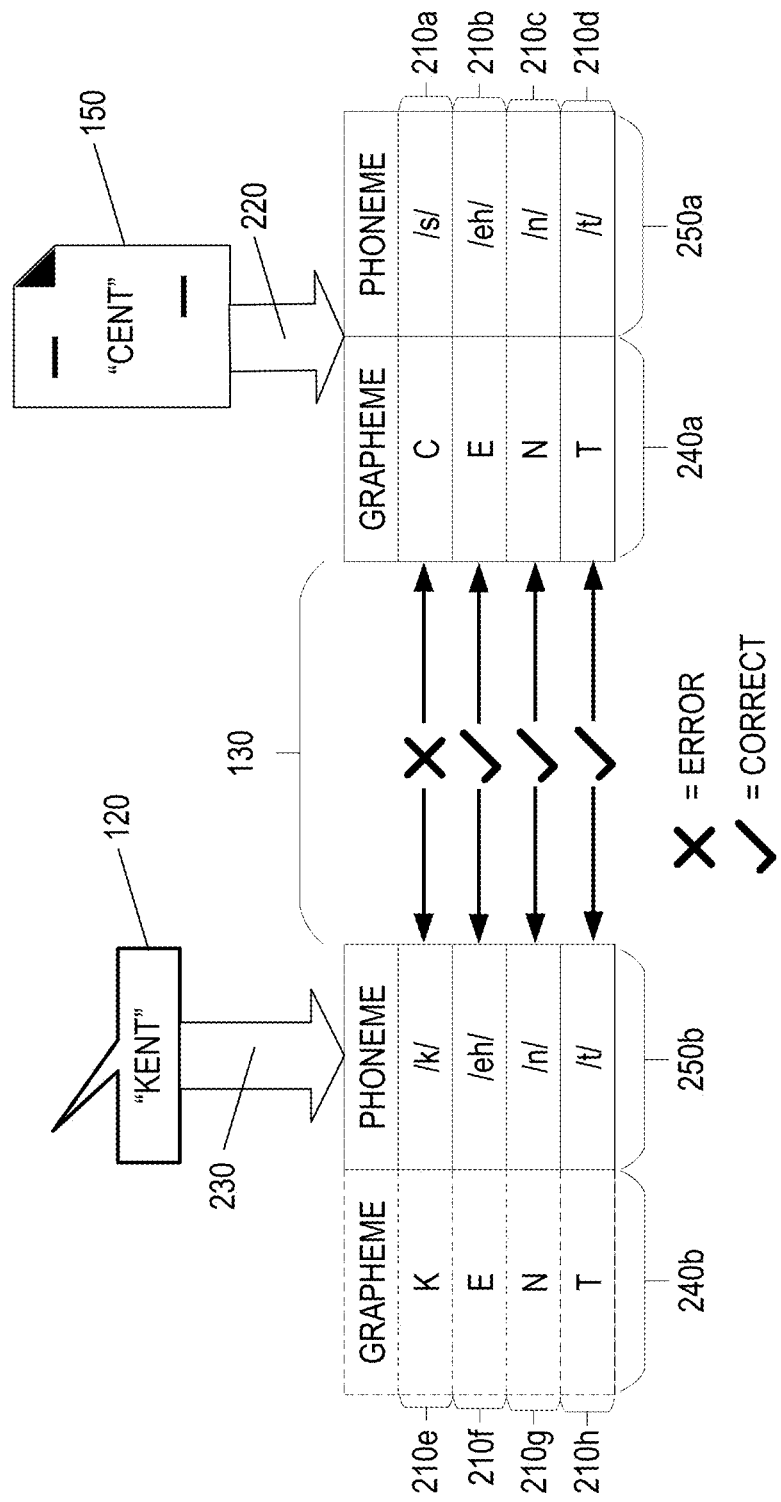

The computing device 110 uses a GPC based approach to analyzing the correctness of the spoken word 120 relative to the target word 150, an example of which is illustrated schematically in FIG. 2. There is at least one ordered set of GPCs 210a-d that describes the target word 150. Each GPC 210a-d identifies a grapheme and a corresponding phoneme.

In this example, the target word 150 is the word "cent." As shown in FIG. 2, the word cent is described by an ordered set of four GPCs 210a-d. The first GPC 210a in the set is a correspondence between the grapheme "c" and the phoneme /s/. The second GPC 210b in the set is a correspondence between the grapheme "e" and the phoneme /eh/. The third GPC 210c in the set is a correspondence between the grapheme "n" and the phoneme /n/. The fourth GPC 210d in the set is a correspondence between the grapheme "t" and the phoneme /t/. It should be noted that the ordered set of GPCs 210a-d comprises an ordered set of graphemes 240a representing the spoken word 150 and an ordered set of phonemes 250a representing the spoken word 150.

The computing device 110 may identify (step 220) the ordered set of GPCs 210a-d as corresponding to the target word 150, e.g., by searching a GPC database for an entry that includes the graphemes "c," "e," "n," and "t," in that order (i.e., the ordered set of graphemes 240a). In some embodiments, the spoken word 150 may have a plurality of correct English pronunciations, in which case, the computing device 110 may, for example, identify multiple sets of GPCs 210, each set corresponding to a correct decoding of the target word 150. In such embodiments, the computing device 110 may evaluate the spoken word 120 against each of the identified sets of GPCs 210.

To analyze the correctness of the spoken word 120 relative to the target word 150, the computing device 110 may translate the spoken word 120 into a corresponding ordered set of spoken phonemes 250b (step 230). In contrast to the target word 150, the spoken word 120 may be represented by phonemes that do not correspond to a valid English word. Alternatively, the spoken word 120 may be represented by phonemes that correspond to a valid English word that is different than the target word 150. Alternatively, if the target word 150 was spoken correctly, the ordered set of phonemes 250b representing the spoken word 120 would match the ordered set of phonemes 250a in the ordered set of GPCs 210a-d representing the target word 150.

In the particular example of FIG. 2, the spoken word 120 is different than the target word 150. More specifically, the spoken word 120 is "kent," which is different than the target word 150 "cent." In this example, the discrepancy between the spoken word 120 and the target word 150 is due to the speaker 160 making a mistake in decoding the "c" grapheme in the target word 150. As such, the computing device 110 translates the spoken word 120 into the ordered set of spoken phonemes 250b (i.e., /k/, /eh/, /n/, /t/), which is different from the ordered set of phonemes in the GPCs 210a-d that represent the target word 150 (i.e., /s/, /eh/, /n/, /t/). As will be discussed in greater detail below, the analysis 130 performed by the computing device 110 may determine one or more ways in which these sets are different.

In some embodiments, the ordered set of spoken phonemes 250b may be comprised in an ordered set of GPCs 210e-h representing the spoken word 120. For example, the computing device 110 may have access to a database of GPC sets, each GPC set corresponding to a word. In some embodiments, the words in the database are all valid words of one or more languages (e.g., English). In other embodiments, the words in the database may additionally include invalid words. For example, the words in the database may include "nonsense" words that represent common decoding errors rather than words that are valid in any particular language. Once the ordered set of spoken phonemes 250b is obtained, the computing device may locate the GPCs 210e-h in a GPC set stored in the database of GPC sets. Alternatively, the computing device 110 may create a GPC set for storage in the database if one does not already exist (e.g., so that future errors of this same kind can be readily identified).

Figure 3:
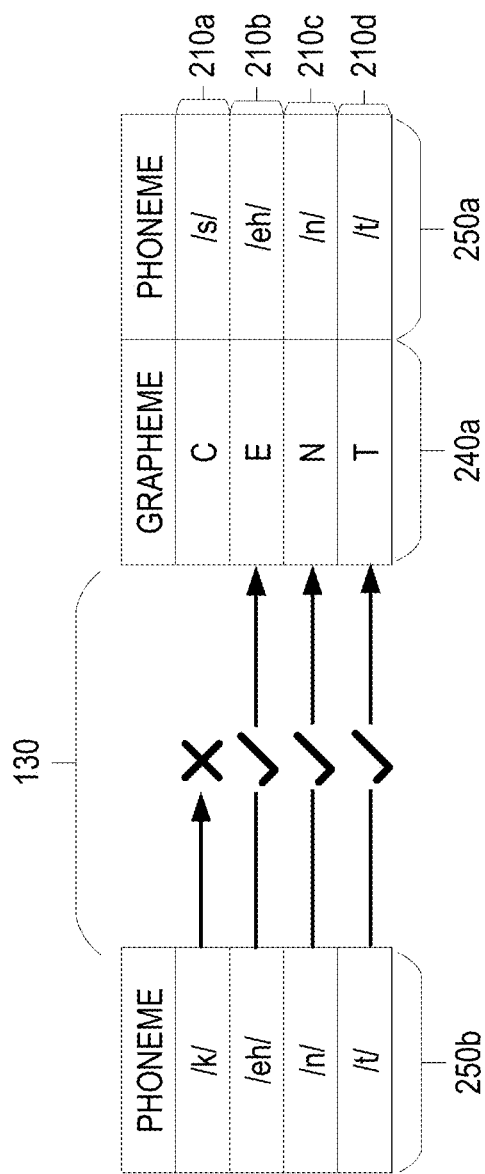

Having translated the spoken word 120 into an ordered set of spoken phonemes 250b, the computing device 110 may employ one or more particular techniques for analyzing the correctness of the spoken word 120. In some embodiments, the computing device 110 attempts to locate each of the spoken phonemes 250b in the ordered set of GPCs 210a-d describing the target word 150, as shown in the example of FIG. 3. In this example, the computing device 110 fails to locate the spoken phoneme /k/ in any of the GPCs 210a-d. Accordingly, the computing device 110 identifies that the phoneme /k/ was incorrectly spoken by the speaker 160, which indicates that the speaker 160 has made a decoding error. Whether the decoding error is due to the speaker 160 improperly including an extra sound in the spoken word 120, or having the correct number of sounds but incorrectly identifying the correct phoneme that corresponds to a grapheme of the target word 150 may be determined through further analysis.

Figure 4:
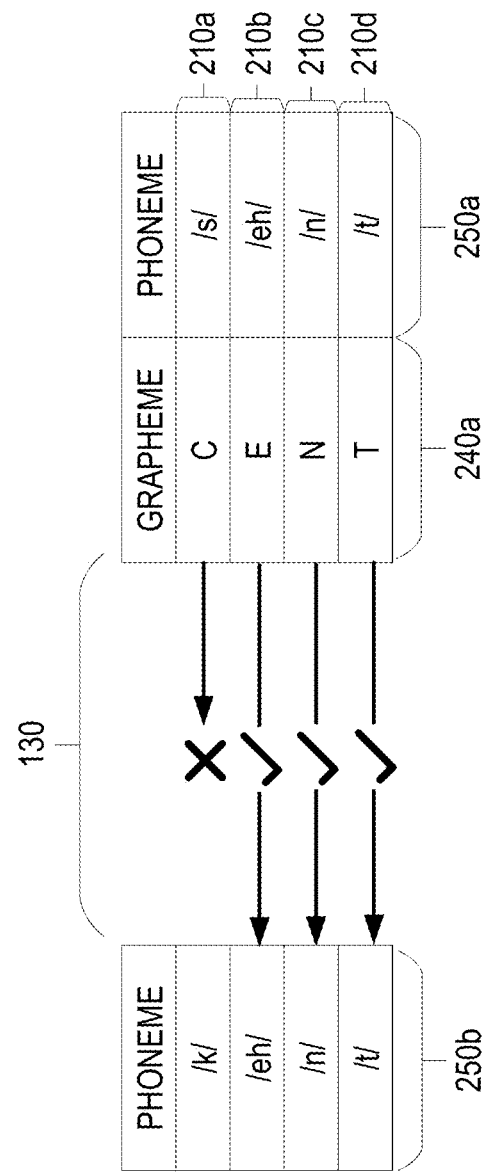

Similarly, in some embodiments, the computing device 110 attempts to locate each of the phonemes 250a describing the target word 150 in the ordered set of spoken phonemes 250b, as shown in the example of FIG. 4. In this example, the computing device 110 fails to locate the phoneme /s/ in any of the set of spoken phonemes 250b. Accordingly, the computing device 110 identifies that the speaker 160 has failed to produce a phoneme that is required to properly recite the target word 150 (which also indicates that the speaker 160 has made a decoding error). Whether the decoding error is due to the speaker 160 improperly including an inadequate number of sounds in the spoken word 120, or having the correct number of sounds but incorrectly identifying the correct phoneme that corresponds to a grapheme of the target word 150 may be determined through yet further analysis.

In some embodiments, the computing device 110 determines whether or not the ordered set of spoken phonemes 250b comprise a same number of phonemes as in the ordered set of GPCs 210a-d, as shown in the example of FIG. 5. In this example, both the set of spoken phonemes 250b and the set of phonemes 250a in the GPCs 210a-d are equal in number. Accordingly, the analysis performed by the computing device 110 determines that the speaker 160 decoded the target word 150 correctly with respect to the number of phonemes. Because the number of phonemes is correct, the computing device 110 may determine that the speaker 160 did not include an extra phoneme /k/ when decoding the target word 150 and correspondingly producing the spoken word 120. Similarly, the computing device 110 may determine that the speaker 160 did not include too few phonemes when decoding the target word 150. Rather, the computing device 110 may determine that the phoneme /k/ is a result of the speaker 160 incorrectly identifying the correct phoneme that corresponds to one of the graphemes of the target word 150. In this example, this error reflects a weakness in the speaker's 160 understanding of GPC 210a, which comprises the "c" grapheme.

In some embodiments, the computing device 110 compares the order of the ordered set of spoken phonemes 250b against the order of the ordered set of GPCs 210a-d, as shown in the example of FIG. 6. For example, the computing device 110 may determine, for each of the spoken phonemes 250b, that the ordinality of the spoken phoneme is the same as its corresponding phoneme in the set of GPCs 210a-d representing the target word 150. In the example of FIG. 6, the each of the phonemes /eh/, /n/, and /t/ are determined to have an ordinality of 2, 3, and 4, respectively, in both the set of spoken phonemes 250b and the set of phonemes 250a in the set of GPCs 210a-d that describe the target word 150. However, if the positions of two or more are swapped, the computing device 110 may identify an error in decoding the graphemes 240a in the correct order.

Based on the analysis 130 performed using the ordered set of GPC 210a-d, the computing device 110 determines whether or not the speaker 160 has properly decoded the target word 150. In this particular example, the computing device 110 identifies GPC 210a as an incorrectly decoded GPC because GPC 210a comprises a phoneme not included in the ordered set of spoken phonemes 250b (i.e., /s/) and/or because the spoken phonemes /k/ include a phoneme not included in the phonemes 250a of the GPCs 210a-d (i.e., /k/).

In at least some embodiments in which the computing device 110 identifies at least one decoding error, the computing device 110 generates a report based on the analysis 130. In this particular example, the report generated by the computing device 110 identifies GPC 210a as having been incorrectly applied in decoding the target word 150.

Figure 7:
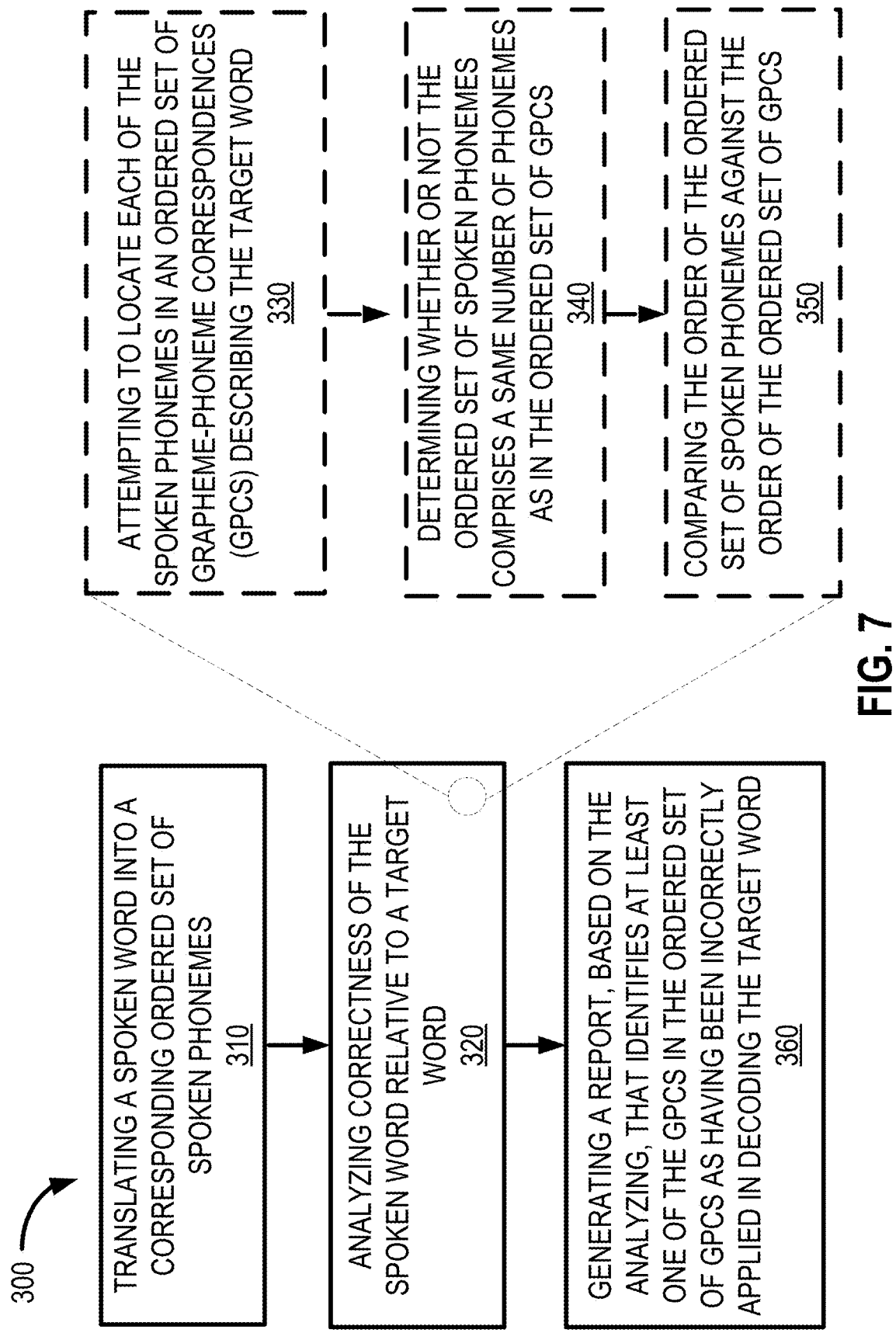
FIG. 7 is a flow diagram illustrating an example method implemented by a computing device, according to one or more embodiments of the present disclosure.

In view of the above, embodiments of the present disclosure include a method 300 implemented by a computing device 110, as shown in FIG. 7. The method 300 comprises translating a spoken word 150 into a corresponding ordered set of spoken phonemes 250a (block 310). The method 300 further comprises analyzing correctness of the spoken word 150 relative to a target word 150 (block 320). The method 300 further comprises generating a report, based on the analyzing, that identifies at least one GPC 210a in an ordered set of GPCs 210a-d as having been incorrectly applied in decoding the target word 150 (block 360).

As discussed above, in some embodiments, the analyzing comprises attempting to locate each of the spoken phonemes 250b in the ordered set of GPCs 210a-d describing the target word 150 (block 330). In some embodiments, the analyzing additionally or alternatively comprises determining whether or not the ordered set of spoken phonemes 250b comprises a same number of phonemes as in the ordered set of GPCs 210a-d (block 340). In some embodiments, the analyzing additionally or alternatively comprises comparing the order of the ordered set of spoken phonemes against the order of the ordered set of GPCs (block 350).

The computing device 110 may additionally or alternatively include in the report one or more other pieces of information that convey diagnostic information concerning the reading ability of the speaker 160; particularly with respect to one or more decoding errors identified by the analysis 130. For example, the computing device 110 may include, in the report, one or more incorrectly spoken phonemes (e.g., /k/ in the above example).

It should be noted that the computing device 110 may obtain the spoken phonemes in a variety of ways, depending on the embodiment. Some such embodiments may include the use of a speech-to-text engine executed by the computing device 110 or another device to which the computing device 110 is connected (e.g., via a communication network).

The use of a speech-to-text engine presents a unique challenge to implementing the solutions described herein. Many speech-to-text engines are not designed to authentically represent the spoken word 120 in circumstances where the spoken word 120 is not a valid dictionary word. Thus, when a speaker 120 mispronounces a word, many speech-to-text engines will attempt to guess at one or more valid words that the speaker intended to say, rather than to output the spoken phonemes 250b representing what they actually did say. This can result in masking or misidentifying decoding errors.

Accordingly, some embodiments obtain the spoken phonemes 250b by analyzing the spoken word 120 directly. In some such embodiments, the computing device 110 identifies each of the spoken phonemes 250b in received audio comprising the spoken word 120 without processing the spoken word 120 into corresponding text first.

Other embodiments route the spoken word 120 (e.g., as a media stream or file) to a speech-to-text engine, and receive text in response. The computing device 110 may then analyze the graphemes of the text to determine whether they each correspond to phonemes in the GPCs 210a-d. In this regard, the computing device 110 may accommodate errors that the speech-to-text engine made in determining the correct text, and may adjust one or more of the scores discussed above where auditory similarity exists between the phonemes corresponding to the text provided by the speech-to-text engine and the phonemes 250a in the set of GPCs 210a-d.

The report 140 generated by the computing device 110 may include a wide variety of diagnostic information resulting from the above discussed analysis, depending on the embodiment. For example, the report may include a phoneme selection correctness score based on an extent to which the spoken phonemes 250b are located in the ordered set of GPCs 210a-d.

The computing device 110 may calculate the phoneme selection correctness score in a variety of ways. For example, the phoneme selection correctness score may be calculated as a ratio between the number of spoken phonemes 250b located in the ordered set of GPCs 210a-d and the total number of phonemes 250a in the ordered set of GPCs 210a-d. Thus, for the example of FIG. 3 in which three of the spoken phonemes 250b were located in the four phonemes 250a of the GPCs 210a-d, the computing device 110 may calculate a score of ¾ (i.e., 75%).

Thus, the phoneme correctness score represents the number of phonemes that are correctly spoken, which is a more sensitive measure than the current standard (i.e., word correctness). This more sensitive approach is able to detect and measure when a student gets a whole word wrong at first, but gradually gets more of the phonemes of the word correct over time. Thus, by comparing the phoneme correctness score of reports taken over time, progress may be detected even when the student continues to get the same words wrong in at least one respect.

The report generated by the computing device 110 may additionally or alternatively include a grapheme selection correctness score based on an extent to which the spoken phonemes 250b are phonetically valid pronunciations of the graphemes in the ordered set of GPCs 210a-d. Thus, continuing with the example of FIG. 3, despite the spoken phoneme /k/ not being located in the phonemes 250a of the GPCs 210a-d, the spoken phoneme /k/ is a phonetically valid pronunciation of the grapheme "c" in some contexts. Therefore, the speaker 160 in this example has correctly selected the grapheme "c" as relevant to decoding the spoken word 120, and has correctly identified a valid pronunciation of the grapheme "c," but has not selected the correct phoneme for this particular spoken word 120, in accordance with the GPC 210a. In some embodiments, the computing device 110 may allot partial credit under such circumstances. In other embodiments, the computing device 110 may give full credit. In yet other embodiments, the computing device 110 may give no credit.

In this regard, the grapheme correctness score may provide an indication of the extent to which the speaker 120 understands the graphemes of the spoken word 120, and may provide an educator with guidance to focus on the situations in which one GPC including the grapheme applies, and when another applies instead.

The report generated by the computing device 110 may additionally or alternatively include a positional correctness score computed based on an extent to which the spoken phonemes 250b are ordered in accordance with the ordered set of GPCs 210a-210d. In some such embodiments, the computing device 110 may go phoneme by phoneme to compare the phonemes in the GPCs 210a-d with the spoken phonemes 250b to determine whether there is an exact match for each phoneme position of the target word 150. Thus, a speaker who is correctly decoding the graphemes 240a of the target word 150 but tends to swap the positions of the corresponding phonemes 250a when speaking the word aloud may score high in other metrics (e.g., phoneme selection) but will not receive full credit for positional correctness.

The report generated by the computing device 110 may additionally or alternatively include an auditory similarity score computed based on how phonetically close the spoken phonemes 250*b* are to the phonemes 240*a* in the ordered set of GPCs 210*a-d*. Certain phonemes, because of how and where they are produced in the mouth, can sound alike. Students who make these errors can often be considered to be on the right track, despite having made an error. An error that is close auditorily is not as bad as a completely unrelated error, and may reflect a need for some fine-tuning in their orthographic mapping in contrast to more severe mistakes that require a more in-depth adjustment.

An example of phonemes that are phonetically close includes the voiced stop consonants /b/ and /d/, which can not only be confused visually, but auditorily as well. The auditory similarity score may give a weighted score based on the extent to which the spoken phoneme is audibly close to the correct phoneme in the GPCs 210*a-d*, with close (but not correct) spoken phonemes receiving more credit than audibly distant spoken phonemes.

Further examples of the diagnostic scoring performed by embodiments of the present disclosure will now be discussed with reference to the table of FIG. 8, aspects of which may replace, supplement, or be performed entirely in addition to one or more of the scoring methods discussed above. According to particular embodiments, the target words 150 and the spoken words 120 are decomposed into component parts (e.g., graphemes, phonemes, morphemes, syllables, etc.) and stored in one or more arrays 400. Although FIG. 8 only shows the phonemes of target words 150 stored in respective positions of the array 400, other embodiments store the phonemes of each spoken word 120 in the same array 400 or another array, depending on the embodiment. For purposes of explanation, further examples will discuss each set of phonemes that corresponds to a unique target word or spoken word as being stored in its own array.

As will be discussed further below, phonemes may be pulled from a dictionary and mapped to separate positions of the array. In this example, spoken words 120 that were entirely correct are omitted, which may avoid the computational cost of performing deep error analysis on words that the computing device 110 has already determined to be correct. However, examples of other embodiments may process all spoken words 120 in a similar fashion.

The spoken phonemes 250*b* stored in the array 400 may correspond to a valid word or a pseudo-word that has no genuine linguistic meaning but nonetheless follow conventional phonotactic and/or graphotactic conventions for the relevant language. Indeed, the spoken phonemes 250*b* stored in the array 400 may even correspond to a non-word that has no genuine linguistic meaning and follows no such phonotactic and/or graphotactic conventions for the relevant language. The computing device 110 may reference a dictionary of words, pseudo-words, and/or non-words to facilitate decomposition of the spoken word 120 into array elements.

One basic diagnostic score includes the number of correct words (e.g., six, in the example of FIG. 8) and/or the number of correct words out of a total number of tested target words (e.g., six out of eleven in FIG. 8, or approximately 55%). The correct word score is a generally coarse indicator of reading/decoding ability, particularly as compared to other scoring mechanisms described herein. Notwithstanding, a correct word score may be useful to include in the report 140, e.g., for purposes of comparison with other students evaluated by other means.

Another score that may be calculated by the computing device 110 and included in the report 140 is a word length similarity score (which may also be called a phoneme discrepancy score). The word length similarity score may reveal an extent to which the speaker 160 approximates the same number of sounds as in the target word 150. To determine this score, the computing device 110 may examine the number of errors between the target word phonemes and error word phonemes. Moreover, the computing device 110 may tabulate how many words had an phoneme inserted and/or omitted. For example, if the speaker 160 produced a spoken word 120 that required one fewer array position to store, then the computing device 110 may count this as a word that was short by one phoneme. The computing device 110 may similarly count the number of spoken words that were short by two phonemes, short 3 phonemes, etc., as well as the number of spoken words that were too long by one phoneme, by two phonemes, and so on. Further, the percent of each category out of the total number of target words tested may be determined. It should be noted that these calculations focus on the number of phonemes, but not the content or accuracy thereof (as those aspects may be the focus of other metrics).

The phoneme discrepancy score can be diagnostically important for several reasons. Over time, as a student learns to read and receives research-based reading instruction, they should stop guessing at words and start decoding them by applying their knowledge of graphemes to access their oral pronunciations. However, at first, emerging readers generally have a poor understanding of graphemes and poor phoneme knowledge. Therefore, they may attempt to sound out a word, but might add unnecessary extra sounds (i.e., phonemes) to the end of the word, or they might come up short by one or more phonemes. By drawing attention to where phonemes are added or deleted, a teacher can learn whether the student still completely guessing (e.g., as revealed by wildly discrepant scores between target and error words).

A teacher may also learn whether a student is adopting a more mature decoding strategy, realizing that letters form sounds, and therefore, recognizing that the number of sounds in their error should not be way off as compared to the target. Teachers may also use this diagnostic information to instruct the child to look at each letter and try and sound it out. For example, if the child did not improve on the number of words read correctly between evaluations and also did not improve on the number of phonemes they got correct, then a check to see whether their errors were not as discrepant as they were last week may be valuable. Indeed, perhaps they are getting better at applying a decoding strategy and getting better at attempting to identify each phoneme in the target word.

Another score that may be calculated by the computing device 110 and included in the report 140 is a tabulation of the number of correct phonemes, a number of incorrect phonemes, and/or statistics based thereon (e.g., percent correct, percent wrong). Particular embodiments may pull the phonemes and graphemes of the target word 150, and only the phonemes of the spoken word 120 from a dictionary that contains GPC mappings for a wide variety of English words (e.g., as many as 170,000 or more). To calculate the total phonemes correct and/or incorrect, the phoneme at each position of a target word array is checked for an identical match against for that same position in the corresponding spoken word array. If there is an exact match, then the phoneme is listed as correct and the number of correct phonemes tallied is incremented. Otherwise, the number of incorrect phonemes is incremented.

The number of phonemes correct represents a more sensitive measure than word correct (the current standard). While it is possible that a speaker 160 can get all phonemes of a target word 150 wrong, improvement may be noted if the speaker 160 got more total phonemes correct.

Additional scores that may be calculated by the computing device 110 and included in the report 140 are tabulations or metrics regarding the number of correctly (or incorrectly) positioned phonemes in incorrectly decoded words (e.g., percentage of error words having one phoneme in the wrong location; number of words having at least two correct phonemes in the correct location, etc.). Particular examples of such scores were discussed above.

As mentioned above, some embodiments include one or more scores that calculate phoneme correctness without regard to location. Knowing if children are mapping any of the correct phonemes onto the target word graphemes may have diagnostic value because it may indicate a maturing decoding strategy. In particular, this metric may be more closely observed in newer students before location-aware become the focus. That is, early readers may not be expected, at first, to have a significant number of correct phonemes that are also in the correct position, whereas developing readers may start to demonstrate increasing proficiency with phoneme placement.

Another score that may be calculated by the computing device 110 and included in the report 140 is the longest number of sequential phonemes correct. This score may have diagnostic value, as a higher number or percent of sequential phonemes correct may indicate that the speaker 160 has adopted a more sophisticated decoding strategy. Correspondingly, low scores in this category may reflect a more novice approach to decoding.

Further scores that may be calculated by the computing device 110 and included in the report 140 relate to positional discrepancies, i.e., the location at which phoneme errors occur. In particular, the computing device 110 may count the words that have phoneme errors at each position of the target word phoneme array. Knowing the pattern of errors by location may assist a teacher in guiding a student to look at all the graphemes in the target word 150 when decoding. For example, tabulation of these scores may reveal that a student (e.g., the speaker 160) is consistently dropping the end phonemes, which might suggest that the words are too long for that particular student at their current stage of reading proficiency. In such cases, the teacher may be led to promote facility with shorter words first. Once the student is able to decode and blend shorter words, then, perhaps they can move on to longer ones.

Yet further scores that may be calculated by the computing device 110 and included in the report 140 include tabulations of the top incorrect graphemes. That is, the computing device 110 may identify phonemes of the target word 150 that did not have a matching phoneme at the same array location in the spoken word 120. In response, a counter associated with the grapheme that corresponds to the unmatched phoneme of the target word 150 may then be incremented. The computing device 110 may thus count grapheme errors and provide a summary of the graphemes that are associated with the highest number of errors.

The particular graphemes that the student missed may particularly valuable in order for teachers to provide students with individualized instruction. By displaying exactly which graphemes a particular student is having the highest degrees of difficulty with, as well as a measure of the extent of that difficulty, the teacher is enabled to provide instruction that is highly tailored to the student's needs. The teacher is further enabled to provide a diversity of lessons that focus on improving GPC understanding for the missed graphemes using a variety of lesson tools and a diverse set of practice words.

The computing device 110 may additionally or alternatively calculate, and include in the report 140, scores (e.g., counts, percentages, ratios, averages) relating to the number vowel and/or consonant errors. For example, having tabulated the number of errors with respect to each grapheme as discussed above, the computing device 110 may sum the consonant errors and sum vowel errors, to provide an indication in the report 140 as to whether consonants or vowels tend to present more difficulty to the student.

Vowel errors tend to be fairly common in emerging readers and readers with reading disabilities because vowel graphemes have a lot more potential sound (i.e., phoneme) mappings than do consonants. For example, the letter "a" can make up to eight different sounds in English, but the letter "b" really makes only one or two sounds (and is sometimes silent). Therefore, one would expect a student to have more vowel errors early on as compared to consonants, and perhaps only vowel errors as they become a better decoder. This metric may be diagnostically valuable in showing teachers whether or not children are becoming sensitive to the fact that vowels are variable and therefore are also becoming aware of the alphabetic code.

Further scores (e.g., error counts, error rates, etc.) that may be calculated by the computing device 110 and included in the report 140 relate the extent to which the speaker 160 makes certain predefined errors, such as errors that implicate some form of visual mistake. Such "visual" errors include, for example, pronouncing any of the graphemes "b," "d," or "p" according to the phoneme properly associated with one of the others (e.g., pronouncing "b" as /d/). Further examples of such errors include pronouncing "n" as /m/, "m" as /n/, "u" as /v/, and "v" as /u/. As can be seen from each of these examples, the phoneme used corresponds to a grapheme that is visually similar to the actual grapheme of the target word 150. GPC errors in which the speaker 160 produces an incorrect phoneme that corresponds to a grapheme having visual similarity to the actual grapheme in the target word 150 are common. Information regarding these kinds of predefined errors can help a teacher identify, for example, a student that is reversing letters due to a visual problem.

Additionally or alternatively, information regarding certain predefined errors may help a teacher to identify, for example, that a student has not cemented a particular grapheme-phoneme pair in their orthographic mapping. This level of detail may be especially valuable when the speaker 160 seems to be non-responsive to instruction, as it helps to identify specific, actionable instructional rules that need reinforcement.

In one particular example, information regarding certain predefined errors may be of particular value in diagnosing problems in students who are learning English (e.g., as a second language). Indeed, the GPCs that are likely to give an someone learning English as a second language may vary greatly depending on which language is native to the speaker 160. As one particular example, certain non-English languages may lack a silent "e" (e.g., Spanish).

That said, there are wide variety of GPCs that commonly present difficulty for students, any number of which may be included among the predefined errors that the computing device 110 is configured to track and provide scores for in the report 140. Yet another example of a specific GPC error that is commonly made includes making the /k/ sound when decoding the word "city," thereby causing the speaker 160 to instead say the word "kitty." To address the wide variety of particular errors that may be common generally, or common to a particular speaker 160, the computing device 110 may be configured with the particular errors of interest to be included in the report 140. That is, the specific predefined errors that the computing device 110 is configured to generate scores for may be changed, e.g., by a user by manipulating a configuration file or otherwise providing appropriate input.

While the examples discussed above describe calculations with respect to specific GPC errors, other examples include similar calculations and reporting for other language constructs such as morphemes, syllable types, blends, letter clusters, word fragments, and so on. In some such embodiments, the computing device 110 may be configured to recognize the presence of one or more of these language constructs in a word, and when a GPC error is detected within the construct, an error with respect to the construct is identified.

Particular embodiments are further advantageous in that the diagnostic information provided may be used to detect pronunciation or dialect differences that might mislead a teacher into believing that a decoding error exists when, in fact, there is no such error (or vice versa). For example, African American Vernacular English (AAVE) has certain features that are not incorrect but result in pronunciations that are different from non-AAVE English for certain GPCs. Among other things, speakers of AAVE may not use one or more fricative phonemes, such as /θ/ (the "th" in "thin") and /ð/ (the "th" in "then).

Another distinctive aspect of AAVE includes the prevalence of final consonant cluster reduction, which is a feature similarly found in West African languages. Final consonant clusters that are homorganic (i.e., have the same place of articulation) and share the same voicing are reduced. For example, the word "test" may be pronounced [tɛs] since /t/ and /s/ are both voiceless. As another example, "hand" may be pronounced [hæn], [hæ], or [hɛ ə n], since the /n/ and /d/ phonemes are both voiced. In contrast, "pant" is generally consistent between AAVE and non-AAVE dialects, as it contains both a voiced and a voiceless consonant in the cluster. It is the plosive in these examples (i.e., /t/ and /d/) that is lost rather than the fricative.

Further distinctive aspects of AAVE speech is that the nasal is either preserved completely or lost with preservation of nasality on the preceding consonant. Speakers may carry this declustered pronunciation when pluralizing so that the plural of test is ['tɛsɨs] rather than [tɛsts]. The clusters /ft/ and /md/ may also be affected.

Further still, the phonemes /sp/, /st/, and /sk/, when at the end of words, tend to be reduced in AAVE, again with the final element being deleted rather than the former. As for clusters ending in /s/ or /z/, these exhibit variation in whether the first or second element is deleted. Similarly, final consonants may be deleted (although there is a great deal of variation between speakers in this regard). Most often, /t/ and /d/ are deleted. As with other dialects of English, final /t/ and /k/ may reduce to a glottal stop. Nasal consonants may be lost, whereas nasalization of the vowel may be retained. For example, the word "find" may be pronounced [fã:]). More rarely, /s/ and /z/ may also be deleted. AAVE speakers may additionally or alternatively use metathesized forms of certain words (e.g., [aks] for the word "ask").

According to some embodiments of the present disclosure, the computing device 110 may be configured to recognize and accommodate different dialects of certain languages and treat dialect-specific variances as equivalently correct. For example, the computing device 110 may detect one or more common variances, such as those discussed above with respect to AAVE, and regard those variances as correct. In some embodiments, the computing device 110 may indicate in the report 140 that instances of AAVE-related pronunciations were detected, and may score these instances in similar fashion as other metrics described above, i.e., not as a measure of errors, but rather as a measure of degree to which the speaker 160 produces speech in a dialect-specific way, which may be helpful to a teacher that provides instruction in a variety of circumstances.

In some embodiments, the computing device 110 additionally or alternatively provides, along with identification of an error made in decoding a given GPC, one or more phonic rules that are relevant to decoding the GPC. Presenting these phonic rules alongside the error may be advantageous because it reduces the requirements on the instructor to assess and educate readers at a GPC level.

Figure 9:
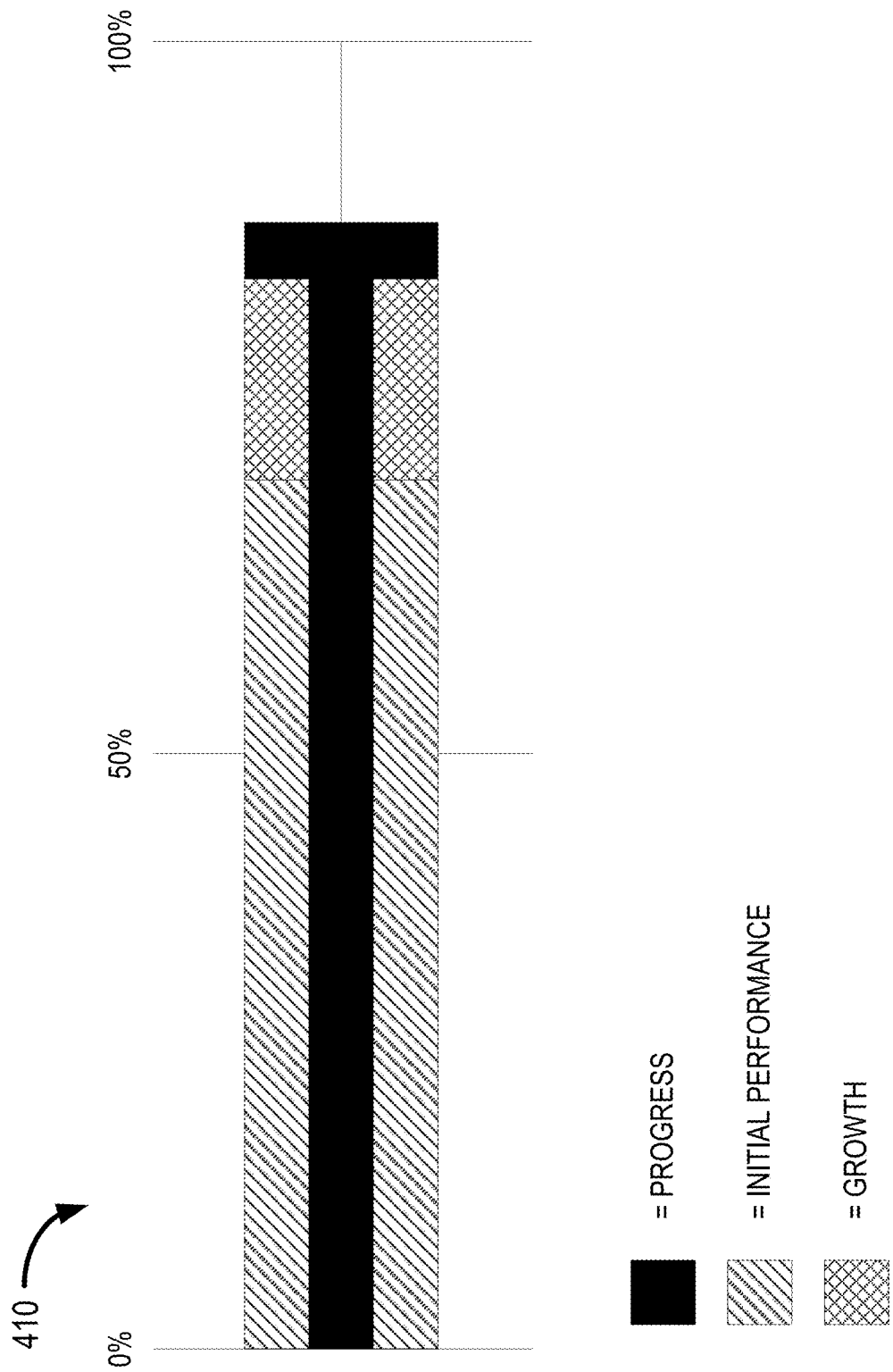
FIGS. 9 and 10 are schematic diagrams of example graphs that may be included in a report generated by a computing device, according to one or more embodiments of the present disclosure.

In some embodiments, the report 140 provides certain diagnostic information in graphical form. An example of a graph 410 that may be included in the report 140 is provided in FIG. 9. The graph 410 in this example indicates performance over the course of multiple evaluations, such that the progress the student has made can be observed. Other graphs for representing any one or more of the scores discussed herein may additionally or alternatively be included, and in particular may be used to illustrate performance over time, growth rate, variance, and other common statistical measures.

Figure 10:
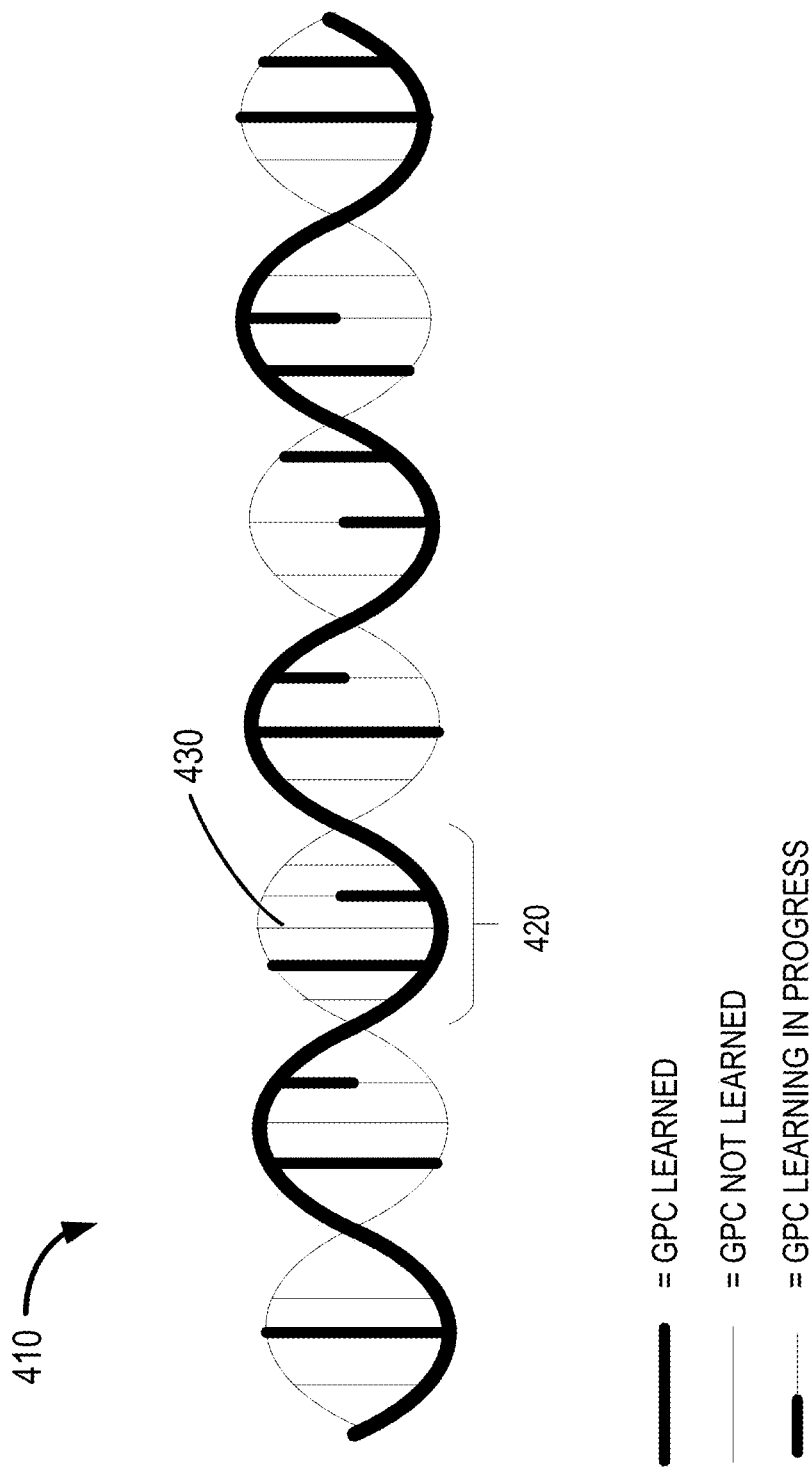

Another example of a graph 410 that may be included in the report 140 is provided in FIG. 10. The graph 410 represents GPC decoding performance using a double helix. Each section 420 of the double helix may, in some embodiments, represent a meaningful grouping of GPCs (e.g., short vowels, digraphs, etc.). Within each section 420, the progress with respect to one or more particular GPCs is depicted by the coloring or shading of a connecting bar 430 between the two helices. In the example of FIG. 10, a connecting bar 430 having a lighter coloring or shading represents a corresponding GPC that has not been learned, whereas a connecting bar 430 having a darker coloring or shading represents a corresponding GPC that has been learned. A connecting bar 430 that is partially lighter and partially darker may represent that a particular GPC is in the progress of being learned. The double helix-style graph 410 may be used to represent any one or more of the scores discussed herein. Indeed, the double helix-style graph may be used to summarize the overall results with respect to one or more of the GPCs tested.

Figure 11A:
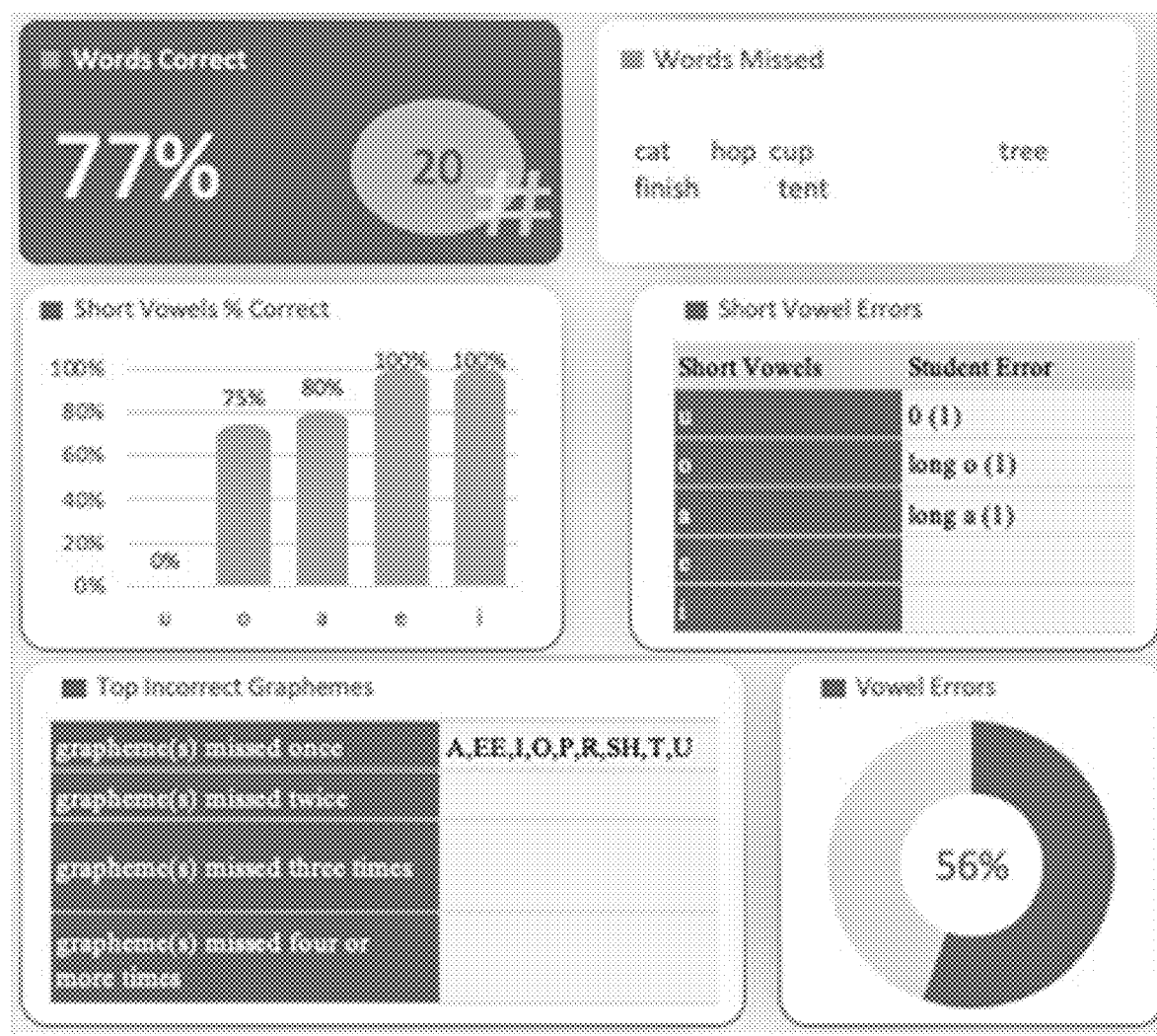
FIGS. 11A-B are an illustration of an example report according to one or more embodiments of the present disclosure.
Figure 11B:
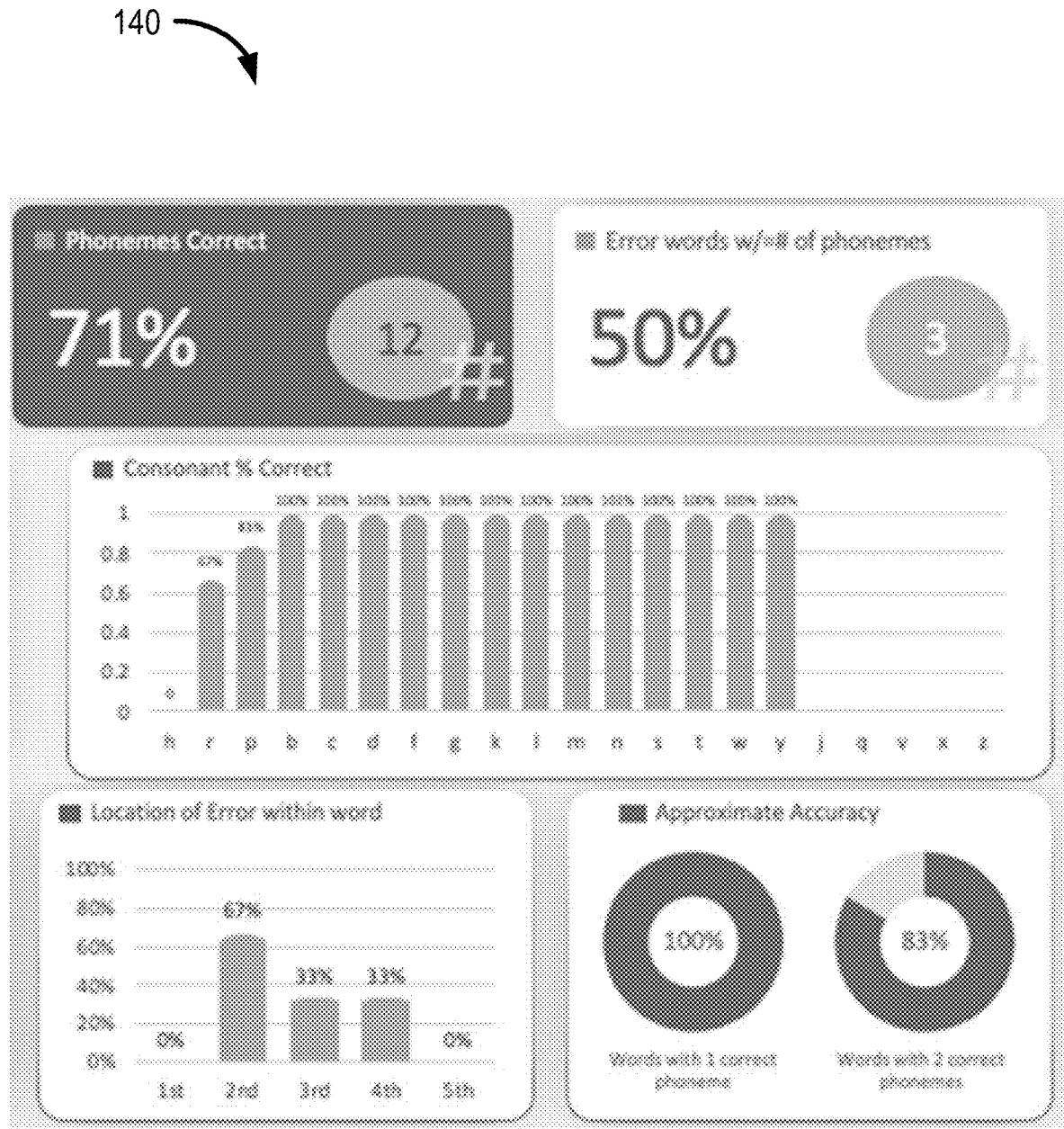

Indeed, the report 140 may include any one or more of a variety of visual elements by which one or more results of the analysis 130 may be represented. These visual elements may include, for example, any number of graphs, charts, tables, text, statistics, computations, scores, and so on. An example of such a report 140 is illustrated in FIGS. 11A and 11B.

In some embodiments, the report 140 targets a specific scope, e.g., a defined syllabus or set of standards. This scope may be highlighted within the report 140 as a bundle of relevant elements, or the entire report 140 may be produced to address the desired scope. For example, the computing device 110 may generate the report 140 as a progress report with respect to a state standard used to determine reading acumen by a public school system.

It should also be noted that, while many of the examples above discuss analysis and reporting of diagnostic information with respect to the understanding of one or more GPCs as determined with respect to analysis of a target word 150 and a spoken word 120, further embodiments analyze and/or report on the understanding of one or more GPCs as a result of multiple evaluations taken over time. Thus, embodiments of the report 150 may additionally or alternatively include metrics describing the change observed over time (e.g., week-to-week).

Further, while many of the examples discussed above describe reporting with respect to an individual speaker 160, other embodiments include reporting that highlights the GPC understanding of the speaker 160 as compared to one or more others for whom similar diagnostic information has been generated. Thus, in some embodiments, the report 140 may include a comparison of any one or more of the scores discussed herein against those of one or more others. In this way, a student may be evaluated in relation to their classmates, others of the same grade, and/or other groups of similarly situated individuals, for example.

In some embodiments, the computing device 110 is further configured to provide the title of one or more pieces of reading material (e.g., books, pamphlets, worksheets) for which its GPCs have been tabulated, analyzed, and/or scored. In particular, the computing device 110 may suggest reading material that is appropriate for the student based on one or more errors detected during the analysis 130. Thus, for example, if a student is struggling with the long "a" in silent "e" syllable type words, but has mastered Consonant-Vowel-Consonant (CVC) words with short "a," then the computing device 110 may identify reading material comprising short "a" phonemes mixed in with a limited number of long "a" opportunities in order for them to practice the weaker skill.

To determine the reading material to propose, the computing device 110 may, for example, apply a set of rules using individual GPC performance as criteria. For example, the computing device 110 may be configured to return reading material in which a GPC recurs within a given frequency range (e.g., once per page, once every three hundred GPCs) in response to the student having an error rate that is greater than a threshold with respect to that GPC.

Additionally or alternatively, the computing device 110 may suggest one or more Individualized Education Plan (IEP) goals based on one or more errors detected by the computing device 110 as a result of the analysis 130. Teachers are generally required to develop goals that are Specific, Measurable, Attainable, Results-oriented and Time-bound (SMART). Many teachers struggle to create such goals. This is currently especially true given that traditional methods of measuring decoding ability lack the diagnostic precision of the embodiments described herein, which provide evaluations down to the GPC level. Word-level metrics traditionally used by teachers are particularly not sensitive enough in the early grades, as children's word level metrics do not typically improve linearly, which can make it appear that a child is not improving toward their goals. This is further problematic because this may consequently cause a school to look like it is not making progress, and can even result in that school being sued for not providing an appropriate education. Embodiments of the present disclosure suggest specific GPCs that a child can work on instead of focusing on word-level goals.

Although the various examples discussed herein primarily focus on the English language, it should be appreciated that the embodiments described herein may be applied to other languages as well.

Figure 12:
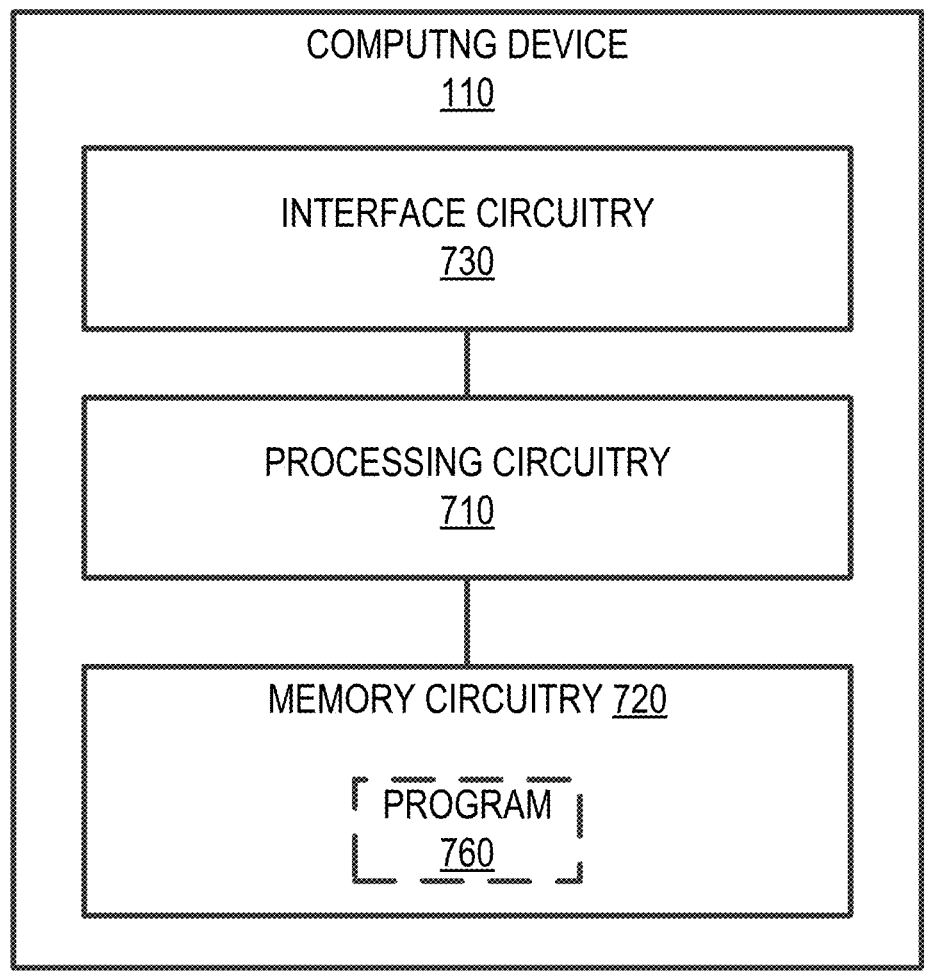
FIG. 12 is a schematic block diagram of an example computing device according to one or more embodiments of the present disclosure.

The computing device 110 of the various embodiments discussed herein may be implemented according to the hardware illustrated in FIG. 12. The example hardware of FIG. 12 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored, e.g., as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, exclusively or in any combination.

The interface circuitry 730 may be a controller hub configured to control the input and output (I/O) data paths of the computing device 110. Such I/O data paths may include data paths for exchanging signals over a communications network and/or data paths for exchanging information with a user of the computing device 110. For example, the interface circuitry 730 may comprise a transceiver configured to send and receive communication signals over one or more of a cellular network, a Wi-Fi network, an Ethernet network, and/or an optical network. The interface circuitry 730 may also comprise one or more graphics adapters, display ports, video buses, touchscreens, graphical processing units (GPUs), and/or displays for presenting visual information to a user. The interface circuitry 730 may additionally or alternatively comprise one or more pointing devices (e.g., a mouse, stylus, touchpad, trackball, pointing stick, joystick), touch sensors, microphones for speech input, optical sensors for optical recognition of gestures, buttons, and/or keyboards for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry (e.g., transmitter circuitry configured to send communication signals over a communication network) and input circuitry (e.g., receiver circuitry configured to receive communication signals over the communication network). Similarly, the output circuitry may comprise a display, whereas the input circuitry may comprise a keyboard. Other examples, permutations, and arrangements of the above and their equivalents are included with the meaning of a computing device 110 as discussed herein.

According to embodiments of the hardware illustrated in FIG. 12, the interface circuitry 730 is configured to obtain a spoken word. The processing circuitry 710 is configured to translate the spoken word into a corresponding ordered set of spoken phonemes, and analyze correctness of the spoken word relative to a target word. To analyze correctness, the processing circuitry 710 is configured to attempt to locate each of the spoken phonemes in an ordered set of grapheme-phoneme correspondences (GPCs) describing the target word 150. To analyze correctness, the processing circuitry 710 is further configured to determine whether or not the ordered set of spoken phonemes comprises a same number of phonemes as in the ordered set of GPCs. To analyze correctness, the processing circuitry 710 is further configured to compare the order of the ordered set of spoken phonemes against the order of the ordered set of GPCs. The processing circuitry 710 is further configured to generate a report 140, based on the analyzing, that identifies at least one of the GPCs in the ordered set of GPCs as having been incorrectly applied in decoding the target word 150. The memory circuitry 720 is configured to store the report 140.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of providing a technical solution to the technical problem of providing granular assessment of grapheme-phoneme correspondence (GPC) correctness, when assessing reading ability, by comparing phonemes of a spoken word to phonemes corresponding to the graphemes of a displayed target word, implemented by a computing device, the method comprising:
    in a database, storing a plurality of target words for decoding by a student;
    for each target word, storing at least one ordered set of grapheme-phoneme correspondences (GPCs) that fully describe such word;
    designating a particular target word, of the plurality of target words, for display to a student in conjunction with a prompt for the student to decode and speak the designated target word;
    obtaining audio corresponding to a spoken word, the spoken word representing a student's attempt to decode and speak the designated target word correctly;
    via a specialized speech-to-text engine, converting the audio corresponding to the spoken word into a corresponding ordered set of spoken phonemes;
    analyzing correctness of the phonemes of the spoken word relative to the phonemes corresponding to the graphemes of the designated target word, the analyzing comprising:
        attempting to locate each of the spoken phonemes, from the obtained audio, in the ordered set of grapheme-phoneme correspondences (GPCs) describing the designated target word;
        determining whether or not the ordered set of spoken phonemes comprises a same number of phonemes as in the ordered set of GPCs; and
        comparing the order of the ordered set of spoken phonemes against the order of the ordered set of GPCs; and
    generating a report, based on the analyzing, that identifies at least one of the GPCs in the ordered set of GPCs as having been incorrectly applied in decoding the designated target word.

2. The method of claim 1, further comprising:
    failing to locate, in the ordered set of GPCs, an incorrectly spoken phoneme in the ordered set of spoken phonemes;
    wherein generating the report comprises, in response to failing to locate the incorrectly spoken phoneme, identifying the incorrectly spoken phoneme in the report.

3. The method of claim 1, wherein the analyzing further comprises identifying, as one of the incorrectly applied GPCs, a GPC in the ordered set of GPCs that comprises a phoneme not included in the ordered set of spoken phonemes.

4. The method of claim 1, wherein generating the report comprises including, in the report, a phoneme selection correctness score computed based on an extent to which the spoken phonemes are located in the ordered set of GPCs.

5. The method of claim 1, wherein generating the report comprises including, in the report, a grapheme selection correctness score computed based on an extent to which the spoken phonemes are phonetically valid pronunciations of the graphemes in the ordered set of GPCs.

6. The method of claim 1, wherein generating the report comprises including, in the report, a positional correctness score computed based on an extent to which the spoken phonemes are ordered in accordance with the ordered set of GPCs.

7. The method of claim 1, wherein generating the report comprises including, in the report, an auditory similarity score computed based on how phonetically close the spoken phonemes are to the phonemes in the ordered set of GPCs.

8. The method of claim 1, wherein converting the audio corresponding to the spoken word into the corresponding ordered set of spoken phonemes comprises processing received audio comprising the spoken word using a speech-to-text engine to obtain text corresponding to the word, and converting the text into the ordered set of spoken phonemes.

9. The method of claim 1, wherein converting the audio corresponding to the spoken word into the corresponding ordered set of spoken phonemes comprises identifying each of the spoken phonemes in received audio comprising the spoken word without processing the spoken word into corresponding text first.

10. The method of claim 1, wherein the step of converting audio corresponding to the spoken word into a corresponding ordered set of spoken phonemes is carried out by a speech-to-text engine that specifically outputs spoken phonemes rather than processing the spoken phonemes, assessing similarity of the spoken phonemes to known words, identifying a most-likely intended word based on the processing and assessing steps, and outputting the most-likely intended word.

11. The method of claim 1, wherein obtaining audio corresponding to the spoken word includes receiving the spoken word directly from the student via a microphone.

12. The method of claim 1, wherein obtaining audio corresponding to the spoken word includes receiving a recording of the spoken word from a remote device.

13. The method of claim 12, wherein receiving the recording of the spoken word from the remote device includes receiving a media stream comprising the spoken word over a network.

14. The method of claim 12, wherein receiving the recording of the spoken word from the remote device includes receiving a file comprising the spoken word.

15. The method of claim 14, wherein receiving the file comprising the spoken word includes receiving the file via network download, email, installed memory device, or Multimedia Messaging Service (MMS) message attachment.

16. The method of claim 1, wherein:
the method further comprises failing to locate at least one of the spoken phonemes, from the obtained audio, in the ordered set of GPCs describing the designated target word, each unlocated spoken phoneme defining an incorrectly spoken phoneme; and
generating the report comprises identifying the at least one incorrectly spoken phoneme in the report.

17. A method of providing a technical solution to the technical problem of providing granular assessment of grapheme-phoneme correspondence (GPC) correctness, when assessing reading ability, by comparing phonemes of a spoken word to phonemes corresponding to the graphemes of a displayed target word, implemented by a computing device, the method comprising:
in a database, storing a plurality of target words for decoding by a student;
for each target word, storing at least one ordered set of grapheme-phoneme correspondences (GPCs) that fully describe such word;
designating a particular target word, of the plurality of target words, for display to a student in conjunction with a prompt for the student to decode and speak the designated target word;
obtaining audio corresponding to a spoken word, the spoken word representing a student's attempt to decode and speak the designated target word correctly;
via a specialized speech-to-text engine, converting audio corresponding to the spoken word into a corresponding ordered set of spoken phonemes;
analyzing correctness of the phonemes of the spoken word relative to the phonemes corresponding to the graphemes of the designated target word, the analyzing comprising:
attempting to locate, in the obtained audio, each of the phonemes from the ordered set of grapheme-phoneme correspondences (GPCs) describing the designated target word;
determining whether or not the ordered set of spoken phonemes comprises a same number of phonemes as in the ordered set of GPCs; and
comparing the order of the ordered set of spoken phonemes against the order of the ordered set of GPCs; and
generating a report, based on the analyzing, that identifies at least one of the GPCs in the ordered set of GPCs as having been incorrectly applied in decoding the designated target word.

18. The method of claim 17, wherein:
the method further comprises failing to locate at least one of the target phonemes, from the ordered set of GPCs describing the designated target word, in the obtained audio, each unlocated target phoneme defining an incorrectly spoken phoneme; and
generating the report comprises identifying the at least one incorrectly spoken phoneme in the report.

19. A method of providing a technical solution to the technical problem of providing granular assessment of grapheme-phoneme correspondence (GPC) correctness, when assessing reading ability, by comparing phonemes of a spoken word to phonemes corresponding to the graphemes of a displayed target word, implemented by a computing device, the method comprising:
in a database, storing a plurality of target words for decoding by a student;
in the database, storing at least one ordered set of grapheme-phoneme correspondences (GPCs) that fully describe such word;
displaying a particular target word, of the plurality of target words, to a student in conjunction with a prompt for the student to decode and speak the designated target word;
obtaining audio corresponding to a spoken word, the spoken word representing a student's attempt to decode and speak the designated target word correctly;
via a specialized speech-to-text engine, converting the audio corresponding to the spoken word into a corresponding ordered set of spoken phonemes;
analyzing correctness of the phonemes of the spoken word relative to the phonemes corresponding to the graphemes of the designated target word, the analyzing comprising:
attempting to locate 1) each of the spoken phonemes, from the obtained audio, in the ordered set of grapheme-phoneme correspondences (GPCs) describing the designated target word, 2) in the obtained audio, each of the phonemes from the ordered set of grapheme-phoneme correspondences (GPCs) describing the designated target word, or 3) both;
determining whether or not the ordered set of spoken phonemes comprises a same number of phonemes as in the ordered set of GPCs; and
comparing the order of the ordered set of spoken phonemes against the order of the ordered set of GPCs; and
generating a report, based on the analyzing, that identifies at least one of the GPCs in the ordered set of GPCs as having been incorrectly applied in decoding the designated target word.

20. The method of claim 19, wherein the steps of displaying, obtaining, converting, and analyzing are carried out for each of the plurality of target words, and wherein generating a report includes generating a report that identifies all of the incorrectly applied GPCs from the analyzing steps carried out for all of the respective target words.

* * * * *